US006941559B2

(12) United States Patent
Schwalb

(10) Patent No.: US 6,941,559 B2
(45) Date of Patent: Sep. 6, 2005

(54) SOFTWARE BUS AND INTERFACE FOR DIGITAL TELEVISION APPLICATION SOFTWARE ENVIRONMENTS

(75) Inventor: Eddie M. Schwalb, Irvine, CA (US)

(73) Assignee: Sharp Laboratories of America, Camas, WA (US)

( * ) Notice: Subject to any disclaimer, the term of this patent is extended or adjusted under 35 U.S.C. 154(b) by 824 days.

(21) Appl. No.: 09/796,196

(22) Filed: Feb. 28, 2001

(65) Prior Publication Data

US 2002/0120945 A1 Aug. 29, 2002

(51) Int. Cl.[7] .............................................. G06F 13/00
(52) U.S. Cl. ...................... 719/328; 725/140; 725/136; 725/152
(58) Field of Search .............................. 725/136–153; 719/328; 709/218, 220, 234; 710/100, 104, 72; 712/19; 713/200

(56) References Cited

U.S. PATENT DOCUMENTS

| | | | |
|---|---|---|---|
| 6,052,750 A | 4/2000 | Lea ............................. | 710/72 |
| 6,085,236 A | 7/2000 | Lea ............................. | 709/220 |
| 6,119,157 A | 9/2000 | Traversat et al. ........... | 709/220 |
| 6,119,167 A | 9/2000 | Boyle et al. ................. | 709/234 |
| 6,119,181 A | 9/2000 | Vorbach et al. ............. | 710/100 |
| 6,119,185 A | 9/2000 | Westerinen et al. ......... | 710/104 |
| 6,119,215 A | 9/2000 | Key et al. ..................... | 712/19 |
| 6,119,229 A | 9/2000 | Martinez et al. ............ | 713/200 |
| 6,125,388 A | 9/2000 | Reisman ..................... | 709/218 |
| 6,374,404 B1 * | 4/2002 | Brotz et al. ................... | 725/46 |
| 2001/0018767 A1 * | 8/2001 | Heughebaert et al. ........ | 725/52 |

* cited by examiner

Primary Examiner—St. John Courtenay, III

(57) ABSTRACT

A software system for use with a Digital Television set-top box. The system uses a software bus application programming interface (API) that is specially designed to make the set-top box compatible with two standard DASE architectures: (1) the architecture wherein the procedural application engine contains the declarative application engine, and (2) the architecture wherein the declarative application engine contains the procedural. An application engine manager uses a function call router to intercept all DASE infrastructure APIs incoming from software applications downloaded by the set-top box from a DTV broadcast. All APIs are routed through the application manager, and all application engines are required to implement the software bus API. A specially-designed software interface also enables the convenient installation of additional applications by simply changing one line of software code.

51 Claims, 5 Drawing Sheets

```
package com.sharp.dase.app;

import java.lang.*;

public interface Home
{
    /**
     *Set the URL or locator for the content to show/activate.
     *@param urlName The name of the URL site.
     */
    public void setURL( String urlName );

/**
     *Display the page (e.g., HTML page or Xlet) using the current URL.
     *If the application wasn't loaded then automatically calls load();
     */
    public void show();

/**
     *Hide the page (e.g.,HTML page or Xlet) and reders the background visible.
     */
    public void hide();

/**
     *Activate the application - move from loaded state to active state.
     */
    public void activate();

/**
     *Activate the application - move from active state to paused state.
     */
    public void pasivate();

/**
     *Load the current HTML page
     */
    public void load();

/**
     *Unload the current HTML page.
     *If the application is showing then automatically calls hide();
     *This will move the application to the 'deleted' state.
     */
    public void unLoad();

/**
     *Return the current container instance.
     */
    public java.awt.Container getContainer();
```

Fig. 7

```
package com.sharp.dase.app;

public interface Events
{
    /**
     * Scroll one HTML page up or to
     * top of current HTML document.
     */
    public void scrollPageUp();

/**
     * Scroll one HTML page down or to the
     * bottom of current HTML document.
     */
    public void scrollPageDown();

/**
     * Scroll to the left of the current HTML page.
     */
    public void scrollLeft();

/**
     * Scroll to the right of the current HTML page.
     */
    public void scrollRight();

/**
     * Scroll upward in the current HTML page.
     */
    public void scrollUp();

/**
     * Scroll downward in the current HTML page.
     */
    public void scrollDown();

/**
     * Move focus to the next available HTML link.
     */
    public void nextLink();

/**
     * Move focus to the previous available HTML link.
     */
    public void previousLink();

/**
     * Select the current focusable HTML link.
     */
    public void selectLink();

/**
     * This method takes you to the previous page.
     */
    public void previousPage();

/**
     * This method takes you to the next page.
     */
    public void nextPage();
```

Fig. 8

SOFTWARE BUS AND INTERFACE FOR DIGITAL TELEVISION APPLICATION SOFTWARE ENVIRONMENTS

BACKGROUND

1. Field of the Invention

The present invention relates generally to Digital Television Application Software Environment (DASE) architectures. More specifically, the present invention relates to architectures providing a software bus and interface for routing application programming interface (API) calls between application engines that are used to implement applications broadcasted in Digital TV broadcast streams.

2. Background Art

Digital technology has added a new dimension to traditional television broadcasting by expanding the types of content that may be broadcasted along with standard program content. For example, applications providing e-commerce capability via television may be broadcasted through digital television (DTV) broadcast signals. However, as can be expected, myriad software compatibility problems have accompanied this expansion of content type. In an effort to provide some uniformity, the National Institute of Standards and Technology (NIST) and the Advanced Television Systems Committee (ATSC) have proposed a broadcast standard, called the Digital Television Application Software Environment (DASE), that sets forth various requirements for DTV systems—e.g., requirements for transmitters and receivers of DTV broadcast signals.

The procedure for broadcasting DTV basically begins with a service provider, such as a program station provider, who broadcasts a digital broadcast stream to a receiving unit (also known as, for purposes of this discussion, a "client-side broadcast rendering machine") situated at a customer's home or other location. The receiving unit, such as a DASE set-top box, detects digital broadcast signals, parses and interprets them, extracts and executes any software application code included in the broadcast, and enables the downloaded applications to display a user interface on a television display.

To effectively run any DASE software applications broadcasted by the service provider, a special type of software environment must be present at the DASE set-top box. This software environment must include application engines to provide the DASE applications or other broadcasted software components with infrastructure services such as the ability to graphically render text in various fonts. Specifically, DASE requires the implementation of two application engines: (1) a procedural application engine (formally referred to as "AEE"), and (2) a declarative application engine (formally known as "PE").

The software environment must of necessity also include an application programming interface (API) to provide a communications interface between software applications. Currently, a standard is being defined by the ATSC for providing a uniform set of APIs, called DASE infrastructure APIs, that provide the above-mentioned infrastructure services for DASE broadcasting systems. A portion of these APIs must be implemented by the two application engines, the procedural application engine and the declarative application engine. Also, the APIs must allow the procedural application engine and the declarative application engine to communicate data and exchange control. For example, the ATSC standard requires that the procedural application engine be able to execute an application capable of rendering a web page given in HTML 4.0/CSS2 format, a functionality provided by the declarative application engine. The standard also requires that the declarative application engine be able to display HTML pages which contain Java Xlets (the DASE equivalent of applets), a capability provided by the procedural application engine.

Two different architectures exist with respect to the relationship between the procedural application engine and the declarative application engine. In one architecture, the procedural application engine contains the declarative engine; in the other architecture, the declarative engine contains the procedural engine. FIG. 1 shows the first architecture where the procedural application engine contains the declarative engine (hereinafter referred to as the "procedural-outside" architecture). In this architecture, a procedural application engine 12 implements, either directly or through wrappers, the APIs to interface with a software component or DASE application 10 downloaded from a digital broadcast. Any declarative portions of the application (e.g., HTML pages) are rendered by a declarative application engine 14 that resides completely within the bounds of the procedural application engine 12. In addition, note that the architectures can include other components such as a content decoder 16, a font engine 18, and a security module 20. The applications typically reside at least in part in a single piece of client-side hardware 22 such as a set-top box.

FIG. 2 shows the second type of architecture where the declarative application engine contains the procedural application engine (hereinafter referred to as the "declarative-outside" architecture). Here, the declarative application engine 14 provides the APIs to interface with the broadcasted software application 10. Any procedural portions of the application (e.g., Java Xlets) are executed by the procedural application engine 12 which resides completely within the bounds of the declarative application engine 14.

Existing technology does not allow the simultaneous implementation of both the "procedural-outside" and "declarative-outside" architectures, and a manufacturer that develops its products in accordance with one architecture cannot easily modify the product development effort to follow the other architecture. Thus, not knowing which architecture the ATSC standard will commit to, which has technical superiority, or which better fits market needs, manufacturers that commit to one of the two architectures take an enormous risk that their development costs will skyrocket.

SUMMARY AND OBJECTS OF THE INVENTION

The present invention provides a software system for use with a Digital Television (DTV) broadcast receiver. The preferred embodiments employ a software bus application programming interface (API) that is specially designed to make the broadcast receiver compatible with two standard DASE architectures: (1) the architecture wherein the procedural application engine contains the declarative application engine, and (2) the architecture wherein the declarative application engine contains the procedural. The preferred embodiments use an application engine manager that employs a function call router to intercept all DASE infrastructure APIs incoming from software applications downloaded by the broadcast receiver from a DTV broadcast. In the preferred embodiments, all APIs are routed through the application manager, and all application engines are required to implement the software bus API—i.e., the software bus API accommodates communication between various DASE receiver components in a way similar to the manner that a hardware bus interfaces between various configurations and components. The preferred embodiments of the present invention also include a specially designed software interface that enables the installation of additional software applications by simply changing one line of software code.

Some embodiments include a preference file that enables switching between architectures pre-programmed into the application engine manager. Other embodiments provide a display on an HDTV or on a computer monitor. Some embodiments include a content decoder and a security module.

The present invention thus provides a DTV broadcast rendering system equipped with special software that makes the system conveniently compatible with both DASE architectures—the "procedural-outside" and the "declarative-outside" architectures. The present invention accordingly enables broadcast rendering machines of varying configurations to automatically download and upgrade application engines broadcasted through DTV broadcasts without requiring the customization or upgrading of each individual broadcast rendering machine. This in turn facilitates the mass downloading and upgrading of application engines transported by a single broadcast to virtually an unlimited number of broadcast receivers. Additionally, the preferred embodiments of the present invention incorporate a "plug-and-play"-type interface to facilitate installation of additional application engines. These advantages provided by the present invention significantly reduce product design risks and costs associated with DTV broadcast rendering systems.

Accordingly, it is an object of some embodiments of the present invention to provide a system that enables broadcast rendering machines to automatically download and upgrade application engines broadcasted through Digital Television broadcasts without requiring the customization or upgrading of individual broadcast rendering machines.

Another object of some embodiments of the present invention is to provide a Digital Television broadcast system that is inherently compatible with both the "procedural-outside" and the "declarative-outside" architectures.

A further object of some embodiments of the present invention is to provide a Digital Television broadcast system that reduces product design risks and costs by providing software that can trivially adapt to both the "procedural-outside" and the "declarative-outside" architectures.

Another object of some embodiments of the present invention is to provide a software configuration means, such as a preference file, that enables a Digital Television broadcast system to switch between accommodating either the "procedural-outside" or the "declarative-outside" architectures.

Yet another object of some embodiments of the present invention is to provide a software bus interface that accommodates communication between various DASE set-top box components in a way similar to the manner that a hardware bus interfaces between various configurations and components.

A further object of some embodiments of the present invention is to provide a single software package that can route and convert DASE infrastructure API calls in both the "procedural-outside" and the "declarative-outside" environments.

Another object of some embodiments of the present invention is to enable trivial architecture switching by providing a function call router that intercepts DASE infrastructure API function calls and provides all the infrastructure APIs for broadcasted DASE applications.

Yet another object of some embodiments of the present invention is to provide an application engine manager with a function call router that intercepts DASE infrastructure API function calls and either forwards or converts and routes APIs between the declarative application engine and the procedural application engine.

Another object of some embodiments of the present invention is to provide a DASE set-top box having a software-based application engine manager that enables architecture-independent API routing.

These and other objects and features of the present invention will become more fully apparent from the following description, drawings, and the appended claims. Other objects will likewise become apparent from the practice of the invention as set forth hereafter.

BRIEF DESCRIPTION OF THE DRAWINGS

The foregoing and other objects and features of the present invention will become more fully apparent from the accompanying drawings when considered in conjunction with the following description and appended claims. Although the drawings depict only typical embodiments of the invention and are thus not to be deemed limiting of the invention's scope, the accompanying drawings help explain the invention in added detail.

FIG. 7 shows exemplary software code relating to the "Home" interface of the preferred embodiments of the present invention; and FIG. 8 shows exemplary software code relating to the "Events" interface of the preferred embodiments of the present invention.

DETAILED DESCRIPTION OF EMBODIMENTS OF THE PRESENT INVENTION

Figure 1:
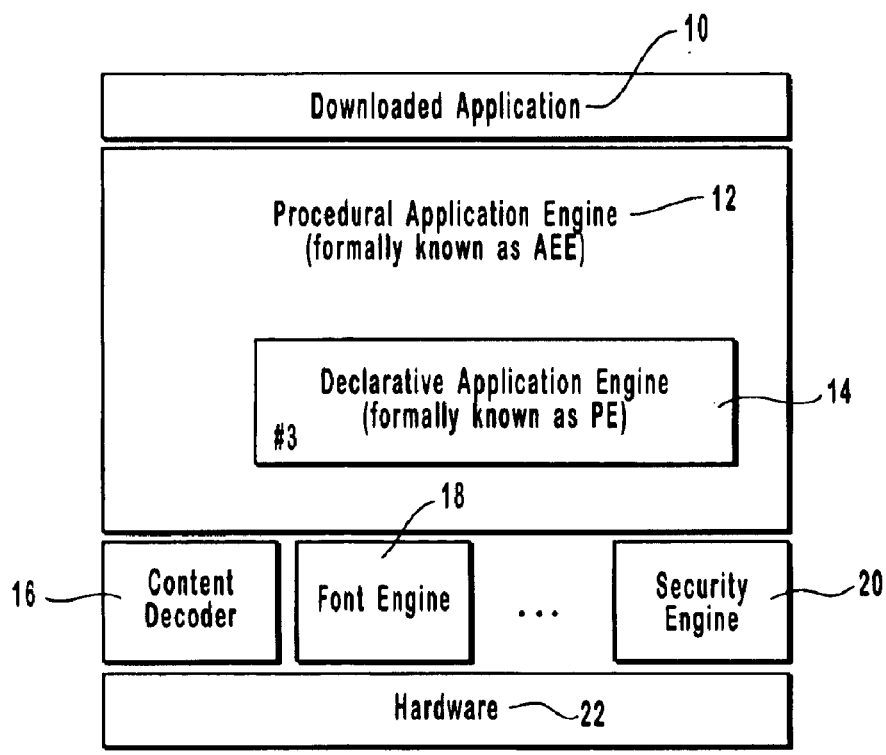
FIG. 1 illustrates an exemplary DASE architecture wherein the procedural application engine contains the declarative application engine.

The following detailed description, in conjunction with the accompanying drawings (hereby expressly incorporated as part of this detailed description), sets forth specific numbers, materials, and configurations in order to provide a thorough understanding of the present invention. In other instances, well-known features are omitted or simplified so as not to obscure the invention. However, the following detailed description in conjunction the drawings will enable one skilled in the art to make and use the present invention even absent the omitted details.

The purpose of this detailed description being to describe the invention so as to enable one skilled in the art to make and use the present invention, the following description sets forth various specific examples, also referred to as "embodiments," of the present invention. While the invention is described in conjunction with specific embodiments, it will be understood, because the embodiments are for explanatory purposes only, that this description is not intended to limit the invention to these particular embodiments. Indeed, it is emphasized that the present invention can be embodied or performed in a variety of ways; the detailed description and the drawings do not limit the scope of the invention because the substantive scope of the present invention is to be limited only by the appended claims. The drawings and detailed description are merely representative of particular embodiments of the present invention.

It should be noted that because some embodiments of the present invention are computer-implemented, the present invention includes embodiments that range from computer-executable instructions as part of computer readable media to hardware used in any or all of the depicted structures. Implementation may additionally be combinations of hardware and computer-executable instructions. For brevity, computer readable media having computer-executable instructions may also be referred to as "software" or "computer software."

Reference will now be made in detail to several embodiments of the invention. The various embodiments will be described in conjunction with the accompanying drawings wherein like elements are designated by like alphanumeric characters throughout.

The present invention may be characterized generally as a software-based system for use with a Digital Television (DTV) broadcast receiver. The preferred embodiments employ a software bus application programming interface (API) that is specially designed to make the broadcast receiver compatible with two standard Digital Television Application Software Environment (DASE) architectures: (1) the architecture wherein the procedural application engine contains the declarative application engine, and (2) the architecture wherein the declarative application engine contains the procedural.

The preferred embodiments of the present invention use an application engine manager that encodes the logic for routing and converting incoming DASE infrastructure API calls (incoming from software applications downloaded by the broadcast receiver from a DTV broadcast) into the above-mentioned software bus API. Preferably, the application engine manager intercepts all DASE APIs with a function call router that is able to change the routing of DASE infrastructure API function calls between the declarative application engine and the procedural application engine. Thus, in the preferred embodiments, all APIs are routed through the application manager, and all application engines are required to implement the software bus API. Indeed, because it serves as an intermediary between application engines in order to accommodate various system architectures, the present invention's software bus API is like a hardware bus that interfaces between various configurations and components. In addition, the preferred embodiments incorporate a specially-designed software interface that enables the installation of additional software applications by simply changing one line of software code.

Hence, the preferred embodiments of the present invention provide a system that enables broadcast rendering machines to automatically download and upgrade application engines broadcasted through DTV broadcasts without requiring the customization or upgrading of individual broadcast rendering machines. This in turn facilitates the mass downloading and upgrading of application engines transported by a single broadcast to a virtually unlimited number of broadcast receivers. Additionally, the preferred embodiments of the present invention incorporate a "plug-and-play"-type interface to facilitate installation of additional application engines. These advantages provided by the present invention significantly reduce product design risks and costs associated with DTV broadcast rendering systems.

Figure 3:
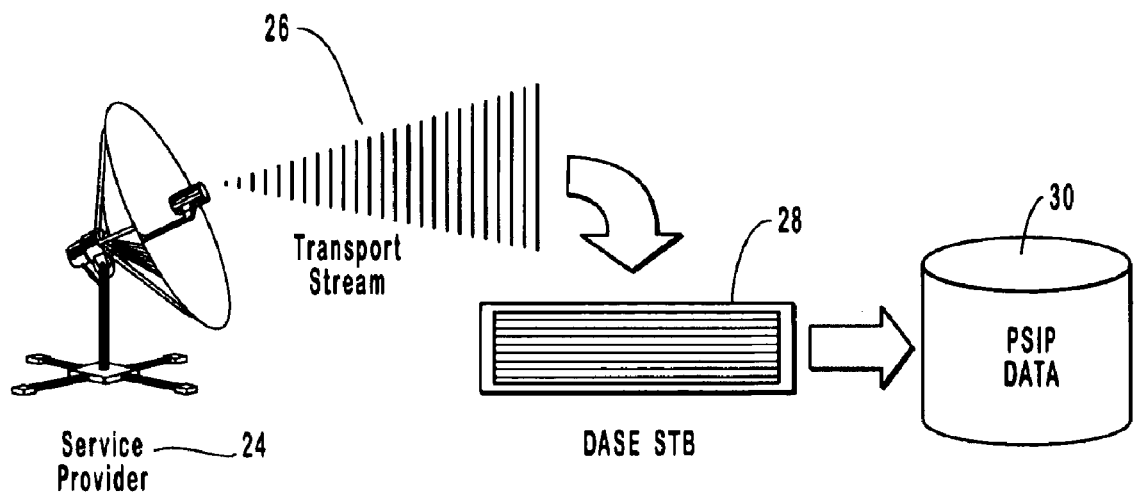
FIG. 3 shows a schematic diagram outlining exemplary basic steps involved in broadcasting Digital Television.

Turning now to FIG. 3, a schematic diagram is shown outlining the basic steps involved in broadcasting Digital Television (DTV) according to the preferred embodiments of the present invention. First, a service provider 24, such as a program station provider or Internet web site, broadcasts a transport stream 26 that includes various types of audio, video, and data content. Audio and video content include television and cable programs and commercial advertisements. Possible data content includes web content, stock reports, telephone directories, and electronic coupons printable by an attached computer. The transport stream 26 comprising various audio, video, and data content is preferably a DASE broadcast stream—i.e., a broadcast stream including software components called DASE applications (e.g., e-commerce applications) that can be run on a client-side broadcast rendering machine such as a set-top box. A client-side broadcast rendering device or receiver 28 (here shown as a DASE set-top box) that is adapted to detect the transport stream 26 receives the transport stream 26, extracts any DASE applications (service components) transmitted via the transport stream 26, and collects Digital Storage Media Command and Control (DSMCC) data from the transport stream 26. Note that it is immaterial whether the DSMCC data is broadcasted in the same broadcast stream as that transporting the DASE applications or whether the DSMCC data is broadcasted in a separate broadcast stream.

Second, the receiver 28 transfers the DSMCC data into a Program Storage and Information Protocol (PSIP) database 30 that may be physically located within or without the receiver 28 (note that PSIP is a standard defined by the Advanced Television Systems Committee (ATSC)). The receiver 28 uses the PSIP data to map the data channel/service locator to the appropriate physical transport stream or broadcast frequency and tune to the correct service or channel. The channel's program content is then displayed on a television display (not shown) which can be any sort of suitable display, including a wide screen TV, a flat screen TV, or a computer monitor.

Figure 4:
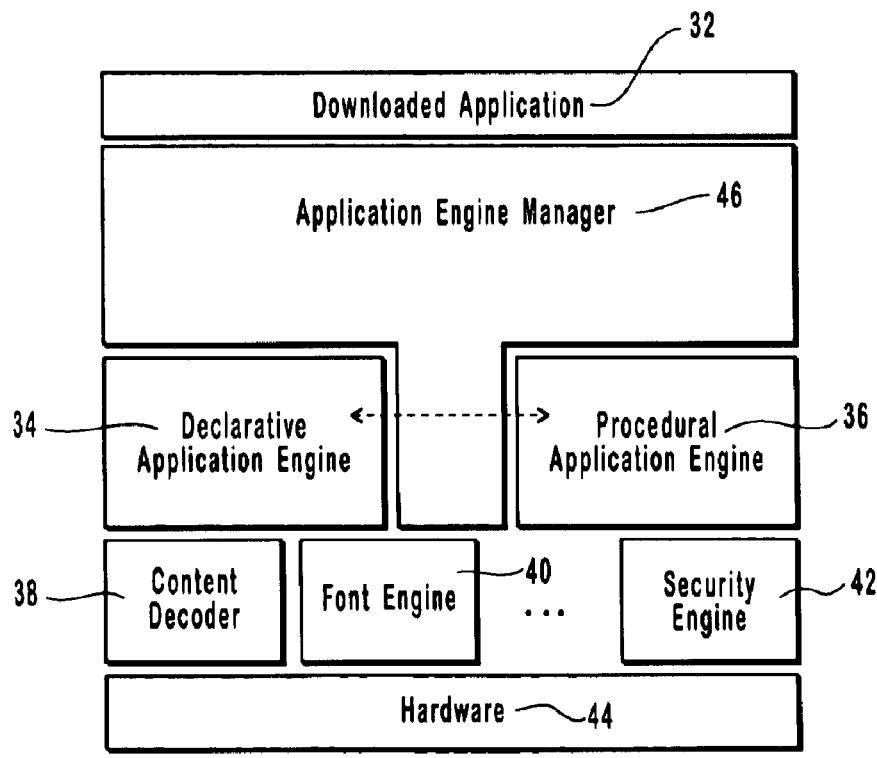
FIG. 4 illustrates an architecture, in accordance with the preferred embodiments of the present invention, showing the relationship between the application engine manager and other application engines.

Turning now to FIG. 4, an architecture is shown representative of the preferred embodiments of the present invention. In the preferred embodiments, a DASE software application 32 is downloaded from the broadcast stream 26 by the receiver or set-top box 28. An application engine manager 46 intercepts the DASE APIs incoming from the broadcasted DASE application 32 and subsequently routes special software bus APIs (specific to the present invention and further discussed below) to a declarative application engine 34, a procedural application engine 36, or other application engines such as a content decoder 38, a font engine 40, or a security engine 42. It is possible for each application engine, the declarative application engine 34 and the procedural application engine 36, to provide only a portion of the DASE APIs to the downloaded software application 32. Also, other engines such as the content decoder 38, the font engine 40 and the security engine 42 may provide a portion of the DASE APIs as well. The portion of the APIs provided by each application engine can vary depending upon the type of operation involved.

In some embodiments of the present invention that contain a content decoder 38 and a security engine 42, calls to the security module 42 are designed to originate at the content decoder 38, thus ensuring that all content presented is secure. Alternatively, other embodiments of the present invention are configured so that all calls to the content decoder 38 originate at the security module 42, thereby ensuring that all decoded content first passes through a security check.

In the preferred embodiments of the present invention, the application engine manager 46 incorporates an API function call router that performs the interception of the incoming DASE infrastructure API function calls. Subsequently, the router either forwards the DASE API function calls to the appropriate engine or converts them into the special software bus API calls that are specific to the present invention. These software bus API calls are special in that they are programmed to provide a sort of "universal" API to take the place of the DASE infrastructure APIs. Thus, the software bus APIs are programmed to be able to convert DASE API calls as well as operate, in either a "procedural-outside" or "declarative-outside" environment (the latter environments are described in the Background section above), as a software interface between the declarative application engine 34 and the procedural application engine 36. In the preferred embodiments of the present invention, all application engines are operably interconnected by the software bus API (as distinguished from the DASE API). The software bus API thus enables—in much the same way that a hardware bus accommodates interoperability between hardware components with differing configurations (e.g., as with master-slave configurations)—the implementation of various receiver or set-top box 28 components having differing software topologies or architectures.

Depending on the desired architecture, the call router routes the software bus API calls to either the declarative application engine 34 or the procedural application engine 36. Thus, all the necessary infrastructure API implementation for the broadcasted software components 32 are provided. In other words, the call router provides the APIs to the various application engines that provide the necessary infrastructure services to the broadcasted software applications 32.

Figure 5:
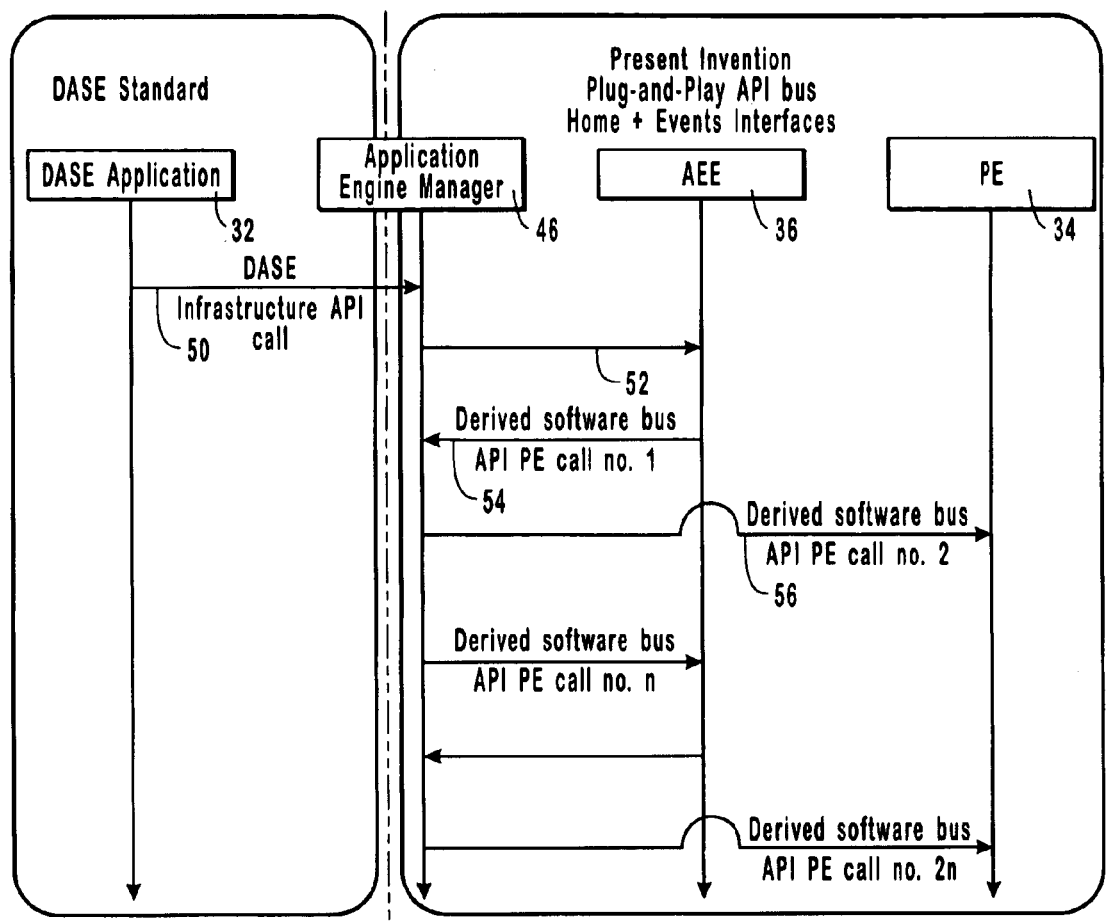
FIG. 5 illustrates the API function call interaction sequence, in accordance with the preferred embodiments of the present invention, between a broadcasted and downloaded software application (here shown as a DASE application), an application engine manager, a procedural application engine, and a declarative application engine.

Turning now to FIG. 5, shown is the API function call interaction sequence, according to the preferred embodiments of the present invention, between the downloaded software application (here shown as a DASE application) 32, the application engine manager 46, the procedural application engine 36, and the declarative application engine 34. More specifically, shown is the preferred means by which the application engine manager 46 enables and controls communication between the procedural application engine 36 and the declarative application engine 34. The API function call sequence will first be described in the context of the "procedural-outside" architecture that is depicted in FIG. 1; the sequence will subsequently be described in the context of the "declarative-outside" architecture depicted in FIG. 2.

In the context of the "procedural-outside" architecture depicted in FIG. 1, all API calls from the declarative application engine 34 originate at the procedural application engine 36. For example, in order to render an HTML web page, a function of the declarative application engine 34, the procedural application engine 36 dispatches the infrastructure APIs on behalf of the declarative application engine 34 in "procedural-outside" architecture environments. More specifically, when the broadcasted DASE application 32 dispatches a DASE infrastructure API call 50, the DASE API call 50 is routed to the application engine manager 46, as are all API calls that originate from the broadcasted software applications 32. Subsequently, and as a result of receiving the DASE API call 50, the application engine manager 46 generates zero or more software bus API calls 52 and routes them to the procedural application engine 36. All software bus API calls described herein are specific to the present invention and are designed to collectively provide the required infrastructure service needed to execute the broadcasted DASE application 32.

In some embodiments of the present invention, the procedural application engine 36 is programmed to request services from the declarative application engine 34 upon receipt of the software bus API calls 52 that call for the rendering of an HTML component. In the preferred embodiments of the present invention, such a request triggers a derived software bus API PE call 54 that is routed from the procedural application engine 36 to the application engine manager 46. Upon receipt of the derived software bus API PE call 54, the application engine manager 46 either directs it to the declarative application engine 34 or converts it to multiple derived software bus API calls that collectively provide the requested service. The application engine manager 46 generates zero or more derived software bus API calls 56 and routes them to the declarative application engine 34.

In the preferred embodiments, when the declarative application engine 34 executes its requested function as a result of receiving the derived software bus API calls 56, control returns to the application engine manager 46. The application engine manager 46 then completes its function call and returns control to the procedural application engine 36. When the procedural application engine 36 completes its function, call control returns once again to the application engine manager 46. Finally, the application engine manager 46 completes its API conversion task and returns control to the downloaded DASE software application 32.

The interaction presented in FIG. 5 can be easily modified to represent how the preferred embodiments of the present invention operate in the "declarative-outside" context. Specifically, all instances referring to the declarative application engine 34 need only be exchanged with the instances referring to the procedural application engine 36 in order to illustrate the API function call switching in the context of the "declarative-outside" architecture. The ability to easily modify the interaction diagram of FIG. 5 to describe operation in the "declarative-outside" context further illustrates the present invention's symmetry and flexibility in being able to adapt to various architecture topologies.

Figure 2:
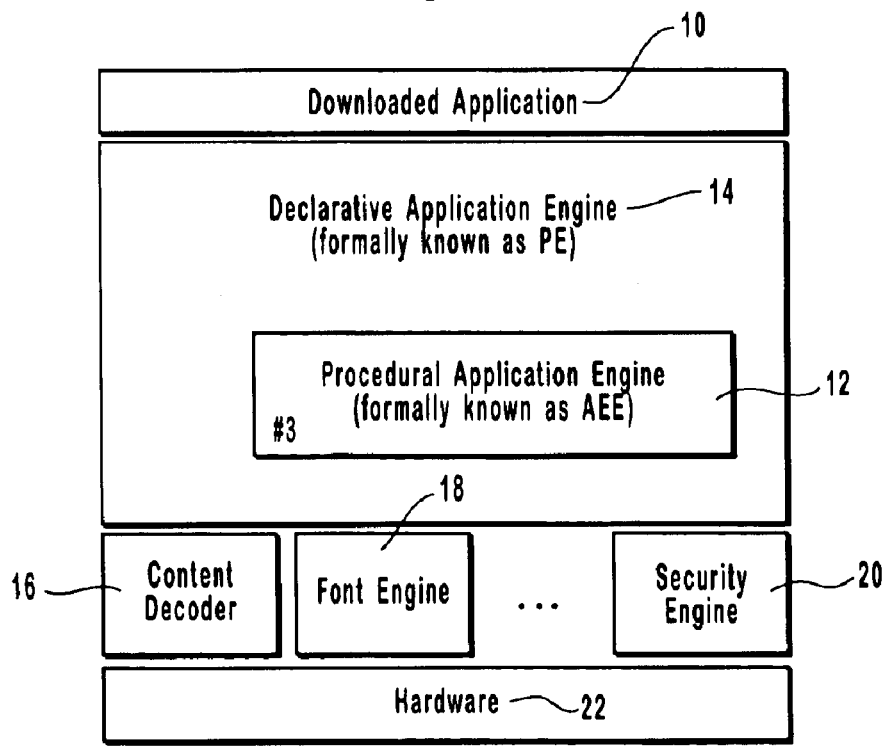
FIG. 2 illustrates an exemplary DASE architecture wherein the declarative application engine contains the procedural application engine.

For example, in the context of the "declarative-outside" architecture that is depicted in FIG. 2, all API calls from the procedural application engine 36 originate at the declarative application engine 34. For instance, in order to execute a Java Xlet, a functionality of the procedural application engine 36, the declarative application engine 34 dispatches the infrastructure APIs on behalf of the procedural application engine 36. Here, as with the API function call switching sequence in the "procedural-outside" framework, all broadcasted software application API calls are directed to the application engine manager 46. That is, when the broadcasted DASE application 32 dispatches a DASE infrastructure API call 50, the DASE API call 50 is routed to the application engine manager 46. The latter then converts them into software bus API calls that, in the case of the present example of a Java Xlet execution request in a "declarative-outside" framework, is routed to the declarative application engine 34. Since the declarative application engine 34 wishes to receive procedural application engine 36 services, software bus API calls are sent from the declarative application engine 34 to the application engine manager 46 for subsequent routing to the procedural application engine 36. The return values of these APIs as well as subsequent execution control is passed back to their caller, namely, the declarative application engine 34.

In the preferred embodiments of the present invention, the application engine manager 46, by encoding the logic for routing API function calls, is the only object that encodes the relationship between the declarative application engine 34 and the procedural application engine 36. Hence, these preferred embodiments provide the advantage that, when the latter relationship is to be modified, the application engine manager 46 is the only piece of code that needs to be modified. In the preferred embodiments of the present invention, any standard or commonly-used architectures (e.g., the "procedural-outside" and "declarative-outside" architectures), can be pre-programmed into the application engine manager 46 so as to enable switching between the pre-programmed architectures without the need for making code changes. To facilitate this switching, the preferred embodiments of the present invention provide a simple text-based preference file. This preference file controls the system decisions as to whether an API call should be converted into derived software bus API calls as well as how the APIs should be routed. Hence is provided a single system design that implements both application engine architectures simultaneously while also allowing switching between the two using soft configuration means such as a preference file. The present invention enables easy and cost-effective wiring of the software design to trivially adapt to either architecture.

Figure 6:
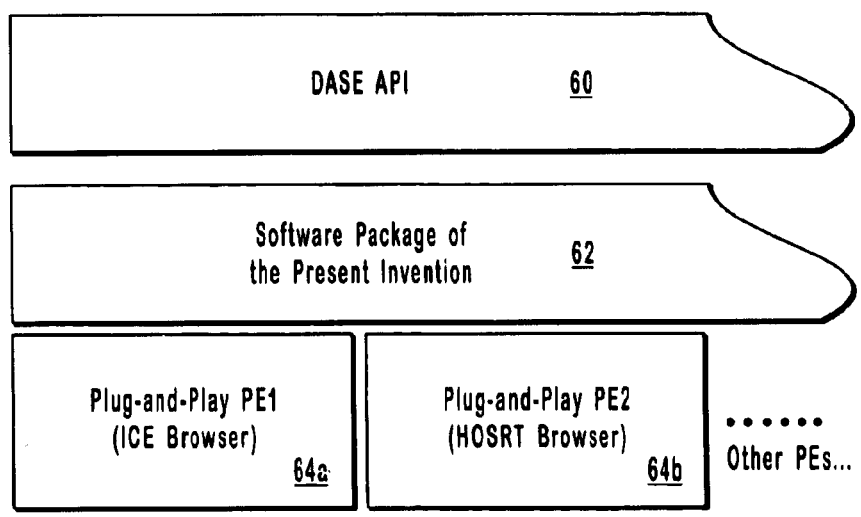
FIG. 6 is a schematic view showing the interrelation of software components involved in some embodiments of the present invention.

FIG. 6 presents a schematic view showing the interrelation of software components involved in some embodiments of the present invention. In particular, the application engine manager 46 (and its related components such as the function call router and software bus API) of the preferred embodiments of the present invention are embodied within a software package 62 that is preferably written in the Java™ software language and is designed to interact with various declarative application engines 64 within the DASE environment through DASE APIs 60. Besides being indifferent to changes in the DASE standards, the software package 62 is also designed to permit application engines to essentially "plug-and-play" within the set-top box software environment, enabling application engines to easily connect and disconnect under various call topologies. Preferably, the software package 62 resides at least in part in a single piece of client-side hardware 44 (schematically depicted in FIG. 4) such as a DASE set-top box 28 (shown in FIG. 3) or a card for a personal computer (PC) that accepts and decodes ATSC signals and feeds them to a DTV-compliant display to effectively turn the computer into a type of set-top box. It is immaterial whether the software package 62 comes pre-installed as proprietary software loaded on the client-side hardware 44 or whether the software package 62 is designed to be installed separately after purchase.

The software package 62 of the preferred embodiments of the present invention specifically provides "plug-and-play"-type functionality through a convenient software interface. This software interface is designed to enable the integration of one of a number of declarative application engines, such as HTML renderers and web browsers, through a single-line code change. For example, to connect a Horst web browser 64*b*, a line of software code might read:

RendererAdapter aBrowser=new HeistermannAdapter( );
Consequently, to connect an ICE browser 64*a*, the above line of software code need only be changed to:

RendererAdapter aBrowser=new ICEAdapter( );
This pattern can also be extended to enable this type of plug-and-play functionality with respect to other application engines such as a security engine 20. Being thus designed so as to make the installation of an application independent of the relationships between the procedural application engine 36, the declarative application engine 34, and other application engines, the preferred embodiments of the present invention greatly simplify the installation of additional software applications to the system of the present invention.

It should be noted that some embodiments of the present invention support soft plug-and-play for the above-described plug-and-play functionality; however, the preferred embodiments support hard plug-and-play. Soft plug-and-play enables the installing and uninstalling of declarative application engines during runtime—i.e., without restarting the application. Hard plug-and-play requires restarting the application and sometimes may even require recompiling it.

The preferred embodiments of the present invention have two interfaces that, for purposes of this discussion, will be respectively called the "Home" and the "Events" interfaces. In the preferred embodiments, both the procedural application engine 36 and the declarative application engine 34 are required to implement these interfaces. FIG. 7 shows exemplary software code relating to the "Home" interface which is designed to provide lifecycle services such as loading, unloading, and constructing the user interface (UI) component as well as showing and hiding the UI. FIG. 8 shows exemplary software code relating to the "Events" interface which is designed to receive all user-input events (e.g., those input from the remote control) and route them to the application engine 46 as if through a callback. It is emphasized that the software code here depicted is exemplary only and should not be deemed to limit the present invention to the specific code or language shown.

The present invention may be embodied in various specific forms without departing from the scope of the present invention. For example, the type of digital encoding format of the broadcasted digital stream is immaterial to the present invention. As another example, High Definition Television (HDTV) broadcasts come within the scope of the present invention as well as standard DTV broadcasts. Also, the present invention may be operable in both wired and wireless environments.

In brief, the present invention provides a Digital Television broadcast rendering system that is conveniently compatible with both the "procedural-outside" and the "declarative-outside" DASE architectures. The present invention accordingly enables broadcast rendering machines to automatically download and upgrade application engines broadcasted through Digital Television broadcasts without requiring the customization or upgrading of individual broadcast rendering machines or set-top boxes. This in turn facilitates the mass downloading and upgrading of application engines transported by a single broadcast to a virtually unlimited number of broadcast receivers. In providing these advantages, the present invention significantly reduces product design risks and costs associated with Digital Television broadcast rendering systems.

It is again emphasized that the present invention may be embodied in other specific forms without departing from its spirit or essential characteristics. The described embodiments herein should be deemed only as illustrative. Indeed, the appended claims indicate the scope of the invention; the description, being used for illustrative purposes, does not limit the scope of the invention. All variations, alternatives, modifications, and equivalents that come within the meaning and range of equivalency of the claims are to be embraced within the scope of the claims.

What is claimed is:

1. An architecture-independent digital television broadcast rendering system comprising:
   receiving a digital television broadcast signal, said signal comprising a software application;
   receiving a command to execute said software application;
   executing said software application, said step of executing comprising:
      intercepting incoming infrastructure API calls from said software application;
      converting said infrastructure API calls into software bus API calls, said software bus API calls being designed to accommodate differing digital television API architectures;
      routing said software bus API calls to application engines;
      receiving API calls from said application engines as derived software bus API calls; and
      routing said derived software bus API calls to the appropriate of said application engines.

2. The system of claim 1 wherein said differing digital television API architectures comprise an architecture wherein a declarative application engine resides entirely within a procedural application engine as well as an architecture wherein a procedural application engine resides entirely within a declarative application engine.

3. The system of claim 2 further comprising switching between said differing digital television API architectures through a single preference file.

4. The system of claim 3 wherein said preference file is text-based.

5. The system of claim 3 wherein said steps of receiving a command and executing said software application are performed by a software package having an interface enabling the installation of applications through changing a single line of software code.

6. The system of claim 5 wherein said software application is an e-commerce application.

7. The system of claim 1 wherein said step of executing is performed by a digital television broadcast receiver.

8. The system of claim 7 wherein said digital television broadcast receiver is a DASE set-top box.

9. The system of claim 7 wherein said steps of receiving a command and executing said software application are performed by a software package having an interface that enables the installation of applications through changing a single line of software code, and wherein said software package physically resides within said digital television broadcast receiver.

10. The system of claim 1 further comprising displaying content on a display as a result of said step of executing.

11. The system of claim 10 wherein said display is HDTV-compliant.

12. The system of claim 10 wherein said display is a computer monitor.

13. The system of claim 1 wherein said software application is provided by an Internet web site.

14. The system of claim 1 wherein said application engines further comprise a content decoder.

15. The system of claim 1 wherein said application engines further comprise a security module.

16. The system of claim 1 wherein said application engines further comprise a content decoder and a security module, and wherein calls to said security module originate at the content decoder.

17. The system of claim 1 wherein said application engines further comprise a content decoder and a security module, and wherein calls to said content decoder originate at the security module.

18. A broadcast rendering system comprising:
   receiving a digital television broadcast signal, said signal comprising a DASE software application;
   receiving a command to execute said DASE software application;
   executing said DASE software application, said step of executing comprising:
      intercepting incoming DASE infrastructure API calls from said DASE software application, said incoming DASE infrastructure API calls being directed to application engines, said application engines comprising a procedural application engine and a declarative application engine;
      converting said DASE infrastructure API calls into software bus API calls, said software bus API calls being designed to accommodate both an architecture wherein the declarative application engine resides entirely within the procedural application engine as well as an architecture wherein the procedural application engine resides entirely within the declarative application engine;
      routing said software bus API calls to the appropriate application engines;
      receiving API calls from said application engines as derived software bus API calls; and
      routing said derived software bus API calls to the appropriate of said application engines.

19. The system of claim 18 further comprising switching, between the architecture wherein the declarative application engine resides entirely within the procedural application engine and the architecture wherein the procedural application engine resides entirely within the declarative application engine, through a single software configuration means.

20. The system of claim 18 wherein said steps of receiving a command and executing said software application are performed by a software package having an interface that enables the installation of applications through changing a single line of software code.

21. The system of claim 20 wherein said software package physically resides within a set-top box.

22. The system of claim 18 wherein said software application is an e-commerce application.

23. The system of claim 18 wherein said step of executing is performed by a digital television broadcast receiver.

24. The system of claim 18 further comprising displaying content on a display as a result of said step of executing.

25. The system of claim 18 wherein said software application is provided by an Internet web site.

26. The system of claim 18 wherein said application engines further comprise a content decoder and a security module, and wherein calls to said security module originate at the content decoder.

27. The system of claim 18 wherein said application engines further comprise a content decoder and a security module, and wherein calls to said content decoder originate at the security module.

28. A method comprising:
    transmitting a digital broadcast stream comprising program content and software applications;
    receiving said digital broadcast stream, said stream comprising a DASE software application;
        receiving a command to execute said DASE software application;
    executing said DASE software application, said step of executing being performed by a DASE set-top box, said step of executing comprising:
        intercepting incoming DASE infrastructure API calls from said DASE software application, said incoming DASE infrastructure API calls being directed to application engines, said application engines comprising a procedural application engine and a declarative application engine;
        converting said DASE infrastructure API calls into software bus API calls, said software bus API calls being designed to accommodate both an architecture wherein the declarative application engine resides entirely within the procedural application engine as well as an architecture wherein the procedural application engine resides entirely within the declarative application engine;
        routing said software bus API calls to the appropriate application engines;
        receiving API calls from said application engines as derived software bus API calls; and
        routing said derived software bus API calls to the appropriate of said application engines; and
    displaying content on a display as a consequence of said step of executing, said display being operatively coupled to said set-top box.

29. The method of claim 28 further comprising switching, between the architecture wherein the declarative application engine resides entirely within the procedural application engine and the architecture wherein the procedural application engine resides entirely within the declarative application engine, through a single preference file.

30. The method of claim 28 wherein said steps of receiving a command and executing said software application are performed by a software package having an interface that enables the installation of applications through changing a single line of software code.

31. The method of claim 30 wherein said software package physically resides within said set-top box.

32. The method of claim 28 wherein said software application is an e-commerce application.

33. The method of claim 28 wherein said display is an HDTV-compatible display.

34. The method of claim 28 wherein said display is a computer monitor.

35. The method of claim 28 wherein said software application is provided by an Internet web site.

36. A method comprising:
    inputting a command to execute a DASE software application, said DASE software application being downloaded from a DTV broadcast onto a broadcast receiver, said receiver performing said command to execute said DASE software application, said step of performing comprising:
        intercepting incoming DASE infrastructure API calls from said DASE software application, said incoming DASE infrastructure API calls being directed to application engines, said application engines comprising a procedural application engine and a declarative application engine;
        converting said DASE infrastructure API calls into software bus API calls, said software bus API calls being designed to accommodate both an architecture wherein the declarative application engine resides entirely within the procedural application engine as well as an architecture wherein the procedural application engine resides entirely within the declarative application engine;
        routing said software bus API calls to the appropriate application engines;
        receiving API calls from said application engines as derived software bus API calls; and
        routing said derived software bus API calls to the appropriate of said application engines; and
    viewing, on a display operatively coupled to said broadcast receiver, content displayed as a consequence of said inputting.

37. The method of claim 36 further comprising switching, between the architecture wherein the declarative application engine resides entirely within the procedural application engine and the architecture wherein the procedural application engine resides entirely within the declarative application engine, through a single software configuration means.

38. The method of claim 36 wherein said step of performing is performed by a software package having an interface that enables the installation of applications through changing a single line of software code.

39. A computer-readable medium comprising instructions for:
    intercepting incoming DASE infrastructure API calls from a DASE software application, said incoming DASE infrastructure API calls being directed to application engines, said application engines comprising a procedural application engine and a declarative application engine;
    converting said DASE infrastructure API calls into software bus API calls, said software bus API calls being designed to accommodate both an architecture wherein the declarative application engine resides entirely within the procedural application engine as well as an architecture wherein the procedural application engine resides entirely within the declarative application engine;
    routing said software bus API calls to the appropriate application engines;
    receiving API calls from said application engines as derived software bus API calls; and
    routing said derived software bus API calls to the appropriate of said application engines.

40. The computer-readable medium of claim 39 further comprising switching, between the architecture wherein the declarative application engine resides entirely within the procedural application engine and the architecture wherein the procedural application engine resides entirely within the declarative application engine, through a single text-based preference file.

41. The computer-readable medium of claim 39 wherein the computer-readable medium is embodied in a software package having an interface that enables the installation of applications through changing a single line of software code.

42. The computer-readable medium of claim 41 wherein said software package physically resides within a set-top box.

43. The computer-readable medium of claim 39 wherein said DASE software application is an e-commerce application.

44. A system comprising:
   a procedural application engine;
   a declarative application engine;
   a preference file for switching between a first DASE API architecture and a second DASE API architecture, said DASE architectures defining the relationship between said procedural application engine and said declarative application engine;
   an application engine manager for routing API calls between said procedural application engine and said declarative application engine, said application engine manager comprising a function call router; and
   a software bus API compatible with both first and second DASE API architectures, said application engine manager employing said software bus API for executing DASE software applications.

45. The system of claim 44 further comprising an interface that enables the installation of applications through changing a single line of software code.

46. The system of claim 44 wherein said preference file is text-based.

47. The system of claim 44 further comprising a display for displaying content of said DASE software applications.

48. The system of claim 44 further comprising a font engine managed by said application engine manager.

49. The system of claim 44 further comprising a content decoder managed by said application engine manager.

50. The system of claim 44 further comprising a security module managed by said application engine manager.

51. A system enabling broadcast rendering machines to automatically download and upgrade application engines broadcasted through DTV broadcasts without requiring the customization or upgrading of individual broadcast rendering machines, said system comprising:
   a plurality of application engines physically residing within a DASE set-top box, said plurality comprising a declarative application engine, a procedural application engine, a font engine, a content decoder, and a security module;
   means for enabling "plug-and-play"-type installation of said plurality of application engines;
   software configuration means for switching between a first architecture wherein said declarative application engine resides entirely within said procedural application engine and a second architecture wherein said procedural application engine resides entirely within said declarative application engine; and
   means for intercepting DASE infrastructure API calls sent by a broadcasted DASE software application to one or more of said plurality of application engines, said means for intercepting further comprising means for converting API calls into software bus API calls and derived software bus API calls, said means for intercepting also further comprising means for routing all API calls between said plurality of application engines.

* * * * *